Aug. 23, 1932.  F. D. JONES ET AL  1,872,747
CORNSTALK CUTTER
Filed Feb. 2, 1931   3 Sheets-Sheet 2
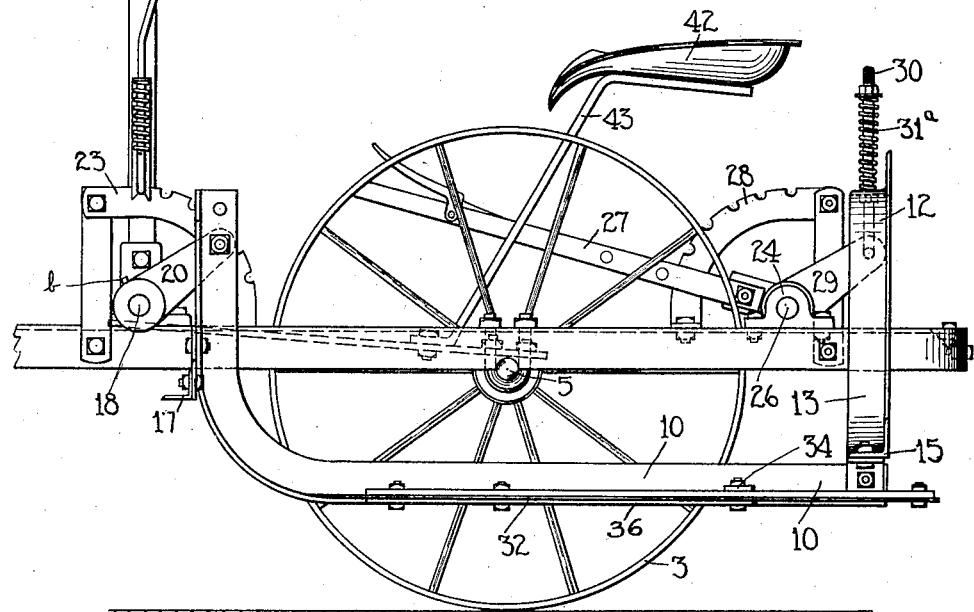
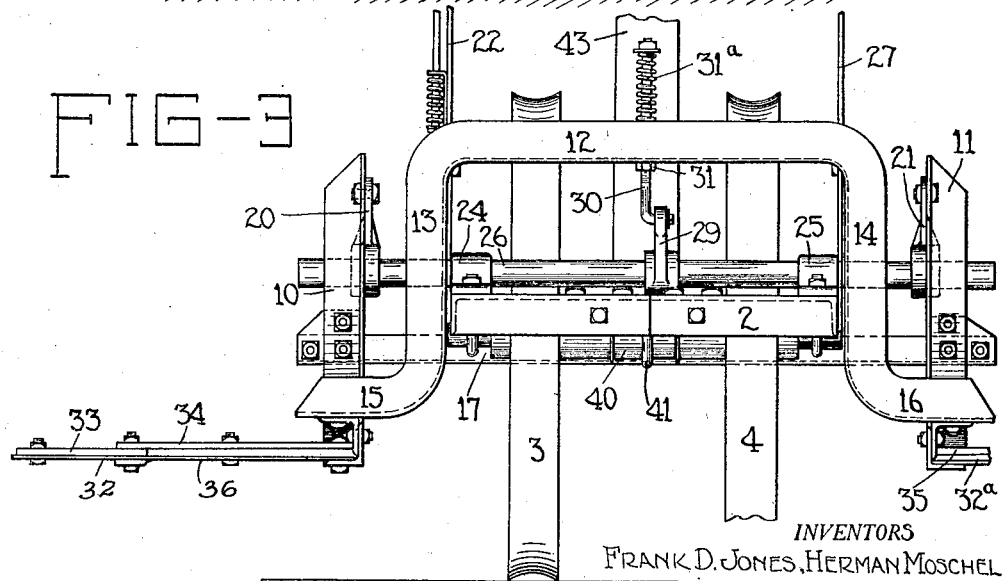
INVENTORS
FRANK D. JONES, HERMAN MOSCHEL

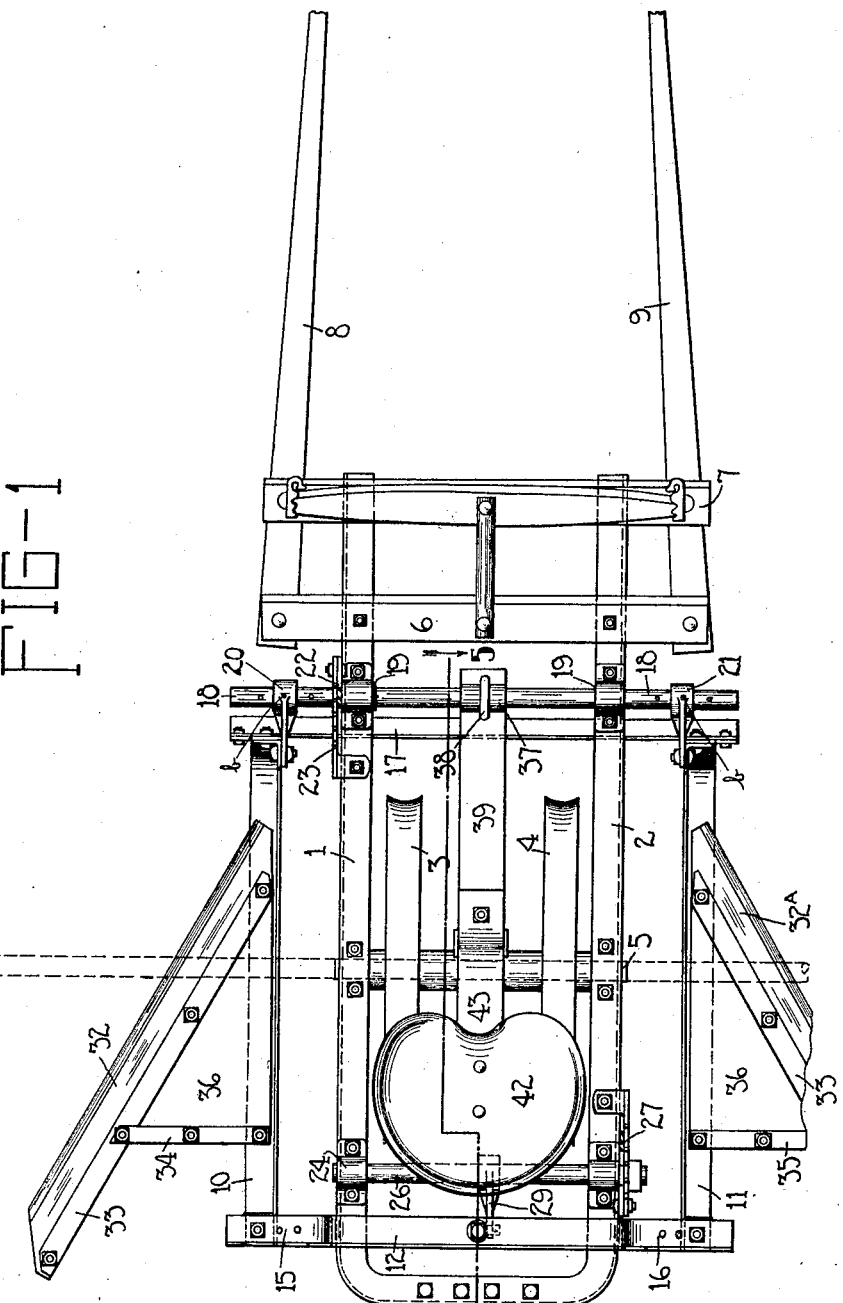

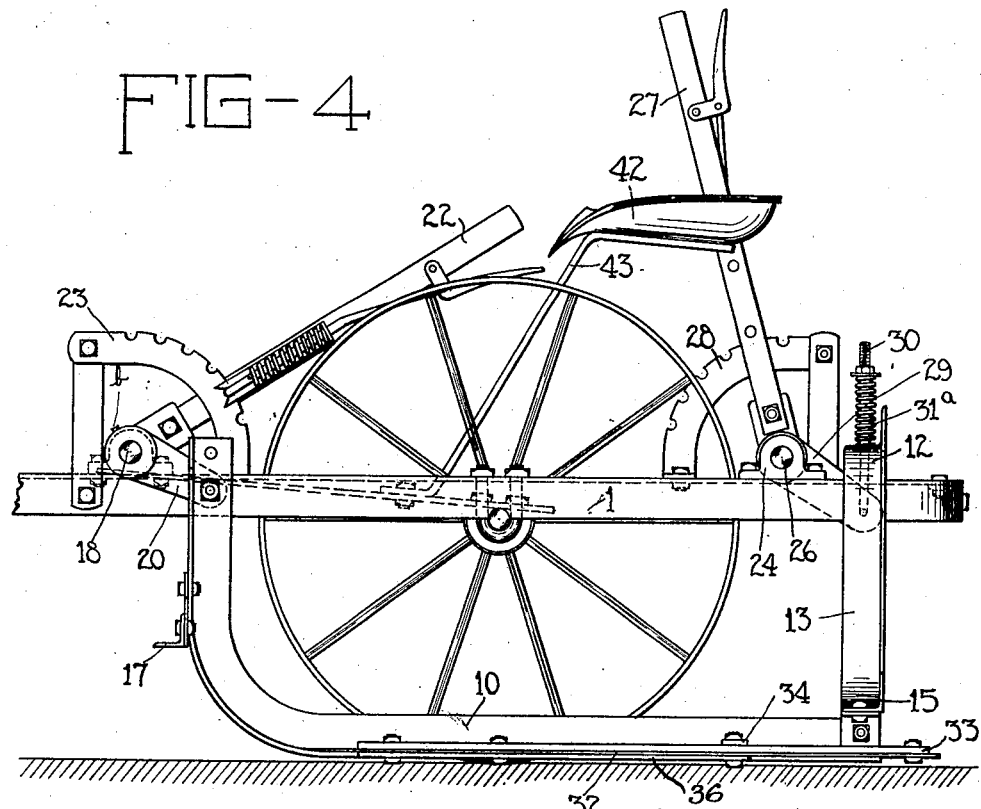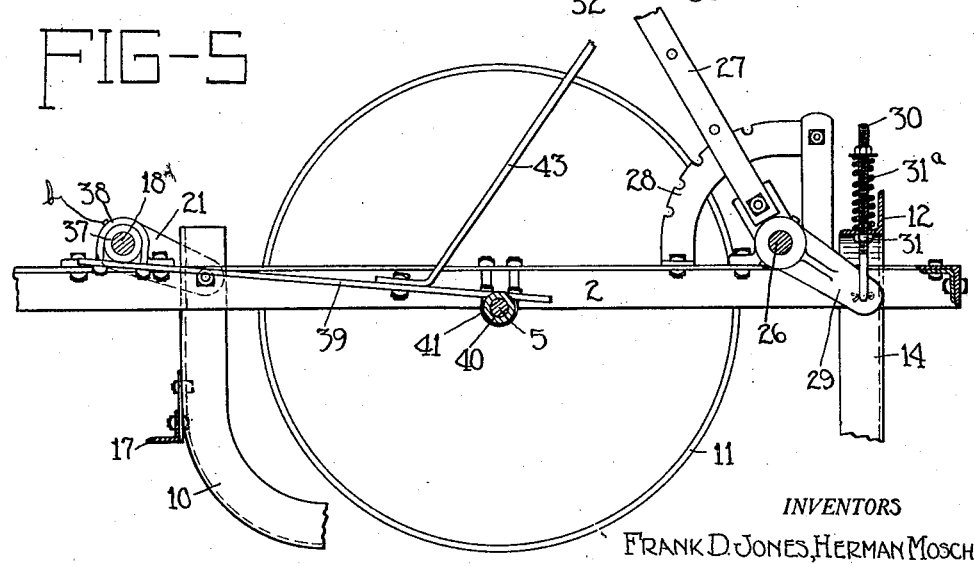

Patented Aug. 23, 1932

1,872,747

UNITED STATES PATENT OFFICE

FRANK D. JONES AND HERMAN MOSCHEL, OF OTTUMWA, IOWA, ASSIGNORS TO DAIN MANUFACTURING COMPANY OF IOWA, OF OTTUMWA, IOWA, A CORPORATION OF IOWA

CORNSTALK CUTTER

Application filed February 2, 1931. Serial No. 512,786.

Our invention relates to that type of machines employed for cutting corn, hemp and similar growths, and has for its object to provide a simple and efficient mechanism by which the stalks can be severed.

A further object of our invention is to provide means for adjusting the cutting devices to vary the height of the cut, and to adjust the front and rear of the cutting devices independently if desired.

A further object of our invention is to connect the rear of the cutters with the main frame in such a manner that the rear thereof will rise upwardly under certain conditions irrespective of the adjusting mechanism.

Referring to the drawings in which similar numerals indicated identical parts—

Figure 1 is a plan view illustrating the general construction of our invention;

Figure 2 is a side elevation of Figure 1 showing the cutters elevated;

Figure 3 is a rear view of Figure 2 partly broken away;

Figure 4 is a view, similar to Figure 2, with cutters lowered; and,

Figure 5 is a detail section on the line 5—5 of Figure 1, illustrating the seat mounting and a spring relief for the rear of the knife supporting frame.

The main frame is composed of bars 1 and 2 extending lengthwise of the machine and parallel and having their rear ends bent toward each other and secured together in any suitable manner. To the forward end portions of the bars 1 and 2 are bolted cross pieces 6 and 7 to which are secured the draft shafts 8 and 9.

The cutter frame includes parallel side bars 10 and 11 connected at their rear ends by an arched bar 12 the sides 13 and 14 of which extend downwardly with their lower portions 15 and 16 extending outwardly, and to the ends of the latter are respectively bolted the bars 10 and 11 having their forward upturned ends connected by a cross bar 17 securely bolted in place. A rock shaft 18 is journaled in bearings 19 on the frame bars 1 and 2, and secured on the ends of said shaft are crank arms 20 and 21 which are pivotally attached to the upturned ends of the bars 10 and 11. A lever 22 is rigidly mounted on the shaft 18 and is provided with the common type of dog latch to engage with any one of a series of notches in a sector 23 bolted to the bar 1.

Journaled in bearings 24 and 25, respectively, mounted on the frame bars 1 and 2, is a rock shaft 26 on which is rigidly attached a lever 27 with an ordinary dog latch to engage with any one of a series of notches in a sector 28 secured on the bar 2. Mounted centrally on the shaft 26 is an arm 29 the end of which is provided with a suitable opening to engage the hook end of a vertical rod 30 which extends loosely through a suitable hole located centrally in the bar 12. To limit an upward movement of rod 30 we place thereon a nut 31 to normally contact with the under side of the bar 12, and on the rod 30 between the upper side of the bar 12 and the upper end of the rod is mounted a coiled spring 31a held in place by a nut and washer on the upper end of the rod.

The cutters consist of knives 32 and 32a, one on each side of the machine, arranged diagonally forward toward the bars 10 and 11 respectively of the cutter frame and to which their forward ends are bolted; the knives are reinforced by bars 33 bolted on the back edge of each knife, respectively. A brace 34 is bolted to the bar 10 and to the knife 32, and a similar brace 35 is bolted to the knife 32a and to the bar 11. The space between each knife and its supporting frame bar is covered by a sheet metal plate 36 secured in place by the bolts which hold the knives, their reinforcing bars and braces together and to the frame bars 10 and 11.

A sleeve 37 is mounted centrally on the rock shaft 18 and secured to it by a U-bolt 38 is the forward end of a bar 39 the rear end of which is secured to a similar sleeve 40, on the axle 5, by a U-bolt 41. The seat 42 is mounted on a spring support 43 bolted to the bar 39, and is so located that the levers 22 and 27 are convenient to the operator.

The machine is constructed of metal throughout, the parts being assembled and secured together to fully withstand the arduous work for which used. As stated the levers 22 and 27 are convenient to an operator and by their actuation the rock shafts 18 and 26 are rotated to rock the crank arms 20, 21, and 29 and to lower the cutter frame and the knives to operating position either close to the ground or to a desired position above the ground to vary the height of the cut or for transportation purposes.

As shown in Figure 4 the knives have been lowered to operate very close to the ground surface and as the latter is usually rough, a degree of flexibility in the cutter frame is desirable in order that the conformation of the surface can be followed by the knives and the stalks severed close to the ground. This flexibility we secure by pivoting the front of the cutter frame forwardly on the main frame so that in the event of an obstruction or undue roughness is met with the lever 22 can be actuated to raise the front of the cutter frame until the runners 10 and 11 will ride over the obstruction, and as the machine advances the rear will rise against the pressure of the spring 31a and will drop again to its previous position when the obstruction is passed. There is an additional advantage in having the front and rear of the cutter frame independently adjustable so that the cutter frame can be always kept horizontal, for a difference in height of horses employed to draw the machine will cant the main frame up or down and when this occurs it is evident that the cutter frame can be adjusted, by manipulation of the levers, to continue its horizontal position.

The frame construction is also novel in that the cutter frame is separate from the main frame but is attached to the latter for independent vertical adjustment, the side bars 10 and 11 of the cutter frame acting as runners on which the knives are mounted. The bars 10 and 11 are connected by an arched bar 12 which extends over and beyond the rear portion of the main frame; forwardly the bar 17, parallel with the bar 12, is rigidly bolted to the bars 10 and 11, a structure presenting a rigid rectangular frame on which the knives are carried and securely bolted. The main frame is also rectangular and of rigid construction to carry the cutter frame and resist any shock in operation of the machine.

The cutter frame side bars, carrying the knives 32 and 32a, are adjustable to accomodate the machine to rows of different distances apart, and to provide for such adjustment we have made the rock shaft 18, the portions 15 and 16 of the arched bar 12, and the cross bar 17 of sufficient length. The adjustment is accomplished by removing the pins b which secure the crank arms 20 and 21 on the rock shaft 18, then the bolts which secure the side bars 10 and 11 to the bar 17 and to the portions 15 and 16 of the arched bar 12 are removed, the crank arms 20 and 21 remaining attached to the side bars 10 and 11. The side bars 10 and 11 are now free to be adjusted to a greater or lesser distance apart, the crank arms 20 and 21 sliding freely on the rock shaft, and when the desired adjustment has been made the pins b are inserted in the holes in the crank arms and a registering hole in the rock shaft. Bolts are again inserted and secured in holes in the bar 17 and in the side bars 10 and 11 and the portions 15 and 16 of the arched bar 12. This lateral adjustment of the side bars and knives is quickly accomplished and is a valuable feature in machines of this class in addition to ease and readiness with which the cutter frame can be adjusted to cut close to the ground or raised for a higher cut or for transportation, and the effectiveness of the machine in operation classes it as a new and valuable addition to agricultural machinery.

What we claim is—

1. In a corn stalk cutter, the combination of a main frame having supporting wheels, a cutter frame pivotally attached to the main frame, angularly disposed knives carried by the cutter frame, and means on the main frame connected with the cutter frame and operative to raise or lower either end of the cutter frame independently of the other.

2. In a corn stalk cutter, the combination of a main frame having supporting wheels, a cutter frame pivotally attached forwardly to the main frame, angularly disposed knives rigidly mounted on the cutter frame, and independent adjusting means on the main frame operative to raise or lower either end of the cutter frame in advance of the other.

3. In a corn stalk cutter, the combination of a main frame having supporting wheels, a cutter frame including side bars positioned respectively on opposite sides of the main frame, means pivotally connecting the side bars forwardly with the main frame, angularly disposed knives rigidly mounted on the side bars, an arcuate member extending above the rear part of the main frame transversely thereof and rigidly secured to the side bars, adjusting means mounted forwardly on the main frame connected with the cutter frame and operative to raise or lower the forward end of the cutter frame, and adjusting means mounted rearwardly on the main frame connected with said arcuate member and operative to raise or lower said member and the rear of the cutter frame.

4. In a corn stalk cutter, the combination of a main frame having supporting wheels, a cutter frame pivotally connected forwardly with the main frame, angularly disposed knives rigidly mounted on the cutter frame, means on the main frame connected with the cutter frame and operative to raise or lower the front and rear of the cutter frame, and means to permit a vertical movement of the rear of the cutter frame irrespective of the raising and lowering means.

5. In a corn stalk cutter, the combination of a main frame having supporting wheels, a cutter frame pivotally connected forwardly with the main frame, angularly disposed knives rigidly mounted on the main frame, means on the main frame connected with the cutter frame and operative to raise or lower the forward end of the cutter frame, means on the main frame connected with the cutter frame and operative to raise or lower the rear of the cutter frame, and means operative to permit a vertical movement of the rear of the cutter frame irrespective of the raising and lowering means.

6. In a stalk cutter, the combination of a main frame having supporting wheels, a rock shaft mounted transversely forwardly on said frame and extending beyond the sides thereof, crank arms secured on the ends of said shaft, a cutter frame having side bars pivotally attached to said arms, knives rigidly mounted on the side bars, a lever on the rock shaft operative to rock said shaft and raise or lower the forward end of the cutter frame, a vertically disposed arcuate member extending transversely over the rear of the main frame and having its ends rigidly attached to the side bars of the cutter frame, a rock shaft mounted on the rear of the main frame, an arm located substantially centrally of said shaft and secured thereon, a vertically disposed rod extending through an opening in said member and having its lower end a hook in engagement with said arm, a stop on the rod contacting with the underside of said member, a lever mounted on the rear rock shaft and operative to rock said shaft and arm to raise or lower said member and the rear of the side bars, a nut on the upper end of the rod, and a coiled spring on said rod between the upper side of said member and the nut on the end of the rod.

7. In a corn stalk cutter, the combination of a main frame having supporting wheels, a rock shaft mounted forwardly on the main frame and extending transversely beyond the sides thereof, crank arms on the ends of said shaft, a cutter frame including side bars having their forward ends bent upwardly and pivotally attached to said arms, knives rigidly mounted on the side bars, a lever on said shaft operative to rock said shaft and arms and raise or lower the forward end of the cutter frame, an arcuate member extending transversely over the rear of the main frame, the terminations of said member rigidly attached to the rear ends of the side bars of the cutter frame, a rock shaft mounted rearwardly on the main frame and having an arm secured centrally thereon, a rod extending vertically through an opening in said member having its lower end in engagement with said arm, a lever mounted on the rear rock shaft and operative to rock said shaft and arm to raise or lower said member and the rear of the side bars, a nut on the upper end of the rod, and a coiled spring on said rod between the upper side of said member and the nut on the end of the rod, said spring adapted to yield under pressure and permit said member to rise irrespective of the operation of the lever.

In witness whereof, we hereunto subscribe our names this 28th day of January, 1931.

FRANK D. JONES.
HERMAN MOSCHEL.